United States Patent [19]

Sugimoto

[11] Patent Number: 4,849,635

[45] Date of Patent: Jul. 18, 1989

[54] INTRUDER PERCEIVING APPARATUS BY MEANS OF INFRARED DETECTION

[75] Inventor: Tadashi Sugimoto, Ibaraki, Japan

[73] Assignee: Optex Co., Ltd., Otsu, Japan

[21] Appl. No.: 285,326

[22] Filed: Dec. 13, 1988

Related U.S. Application Data

[63] Continuation of Ser. No. 944,332, Dec. 18, 1986, abandoned.

[30] Foreign Application Priority Data

Jan. 24, 1986 [JP] Japan .................................... 61-9000

[51] Int. Cl.$^4$ .................................................. G01J 1/10

[52] U.S. Cl. ...................................... 250/342; 340/567

[58] Field of Search ............................ 250/342; 377/6; 340/567

[56] References Cited

U.S. PATENT DOCUMENTS 4,263,585 4/1981 Schaefer .............................. 250/342

4,339,748 7/1982 Guscott et al. ..................... 250/342

4,342,987 8/1982 Rossin ................................ 250/353

4,386,275 5/1983 Kalmowitz et al. ................ 250/342

4,523,095 6/1985 Keller-Steinbach ................ 250/342

4,551,711 11/1985 Akiyama et al. .................... 250/353

*Primary Examiner*—Janice A. Howell

*Attorney, Agent, or Firm*—Koda and Androlia

[57] ABSTRACT

An apparatus for perceiving an intruder by means of detecting infrared rays radiated from the intruder through a plurality of detectable infrared flux enveloping spaces spanned supposedly between the infrared receiving portion of the apparatus and a plurality of sub-domains supposed on the ground, the detectable infrared flux enveloping spaces being arranged densely so that at least two of them may always be crossed by an intruder, and such a dense arrangement of the detectable infrared flux enveloping spaces being effected with a multi-lens system molded in one body so as to have on its surface a plurality of infrared converging lenses having their respective principal axes differently directed providing the detectable infrared flux enveloping spaces.

6 Claims, 4 Drawing Sheets

INTRUDER PERCEIVING APPARATUS BY MEANS OF INFRARED DETECTION

This is a continuation of application Ser. No. 944,332, filed Dec. 18, 1986 now abandoned.

BACKGROUND OF THE INVENTION

The present invention relates to an apparatus for perceiving an intruder into an area by detecting infrared rays being radiated from the intruder.

All the bodies at an ordinary temperature, whether animate or inanimate, radiate infrared rays having a peak spectrum around 10 μm. This phenomenon is applied to various kinds of systems for perceiving a person intruding into a specific area or passing through a predetermined position. A typical example of such intruder perceiving system is described in accordance with FIGS. 6 and 7. In FIG. 6, which schematically shows the aspect of a conventional system for perceiving a person P intruding into a predetermined domain D on the ground (or floor) G, there are supposed within the domain D a plurality of discrete sub-domains, for example, three separate sub-domains D1, D2 and D3, and an infrared detecting apparatus 1 is located at a suitable height h above the ground G. The infrared detecting apparatus 1 is devised so as to detect the total of only the (infrared) rays falling thereto within detectable-rays enveloping slender spaces S1, S2 and S3 which are defined by the geometrical envelopes spanned between the infrared receiving portion 11 of the infrared detecting apparatus 1 and the circumferences of the sub-domains D1, D2 and D3. In case there are no intruders in the domain D, the infrared detecting apparatus 1 outputs as a background signal the total signal corresponding the infrared rays radiated form the sub-domains D1, D2 and D3. When a person P having a height $h_p$ intrudes into the domain D and crosses the detectable-rays enveloping spaces S1, S2 and S3 one after another, the output from the apparatus 1 varies as indicated by a solid line in the graphic representation shown in FIG. 7. Such an output from the infrared detecting apparatus 1 can be used, for instance, to trigger an alarm signal generating device (not shown), thereby enabling to constitute a burglar alarm system. In this case the alarm signal generating device must, of course, be devised so as to be triggered by a signal level not higher than the (lowest) level indicated with a one-dot chain line shown in FIG. 7. However, the intruder perceiving system shown in FIG. 6 has an important disadvantage that the alarm is undesirably put into action against the intrusion of a small animal short of stature such as a dog or the like because the infrared detecting apparatus 1 responds also to such a small animal and outputs signals with a maximum level exceeding, as shown with dotted lines in FIG. 7, the above-mentioned alarm system triggering level. Such a disadvantage may be cleared, for example, by increasing the area of each of the sub-domains D1, D2 and D3, as is illustrated in FIG. 8. In the figure a representative enlarged sub-domain (denoted by Ds representing D1, D2, D3 of FIG. 1) has an area much larger that that occupied by an animal A, and symbol $S_d$, $S_p$ and $S_a$ respectively stand for the cross-sectional area of the detectable-rays enveloping space Sr (representing S1, S2, S3 of FIG. 6) and those of the infrared radiation fluxes from a person P and the animal A. As is understood from FIG. 8, an increased area of the sub-domain Ds comes to make a relation $S_a/S_d < S_p/S_d$ exist. This means that the relative intensity of the infrared radiation from the animal A is favorably lower than that from the person P. However, the increased area of the sub-domain unfavorably decreases also the relative infrared radiation from the person. According to the above favorable and unfavorable effect, the graphic representation of the output from the infrared detecting apparatus 1 can be illustrated as shown in FIG. 9, which corresponds to FIG. 7. Though the higher output level in case of a person (solid line) is distinguished from the lower output level in case of a small animal, as is obvious from FIG. 9, the clearance d between the minimums of the former and the maximums of the latter is made small. This makes it critical to determine a signal level to steadily triger a following apparatus such as a burglar alarm. In addition a decreased level of the output (in the case of the intruder being a person) also is very disadvantageous.

Moreover, in accordance with the above-mentioned intruder perceiving system as shown in FIG. 6, the conventional infrared detecting apparatus 1 employed therein must comprise, whether the areas of the sub-domains are increased or not, a complex lens assemby consisting of many infrared converging lenses which have their respective principal axes directed to their corresponding sub-domains supposed on the ground G. The complex lens assembly consisting of many lenses makes the mechanical constitution of the apparatus 1 very complicated.

OBJECTS AND SUMMARY OF THE INVENTION

The present invention aims at eliminating the disdvantages and difficulties accompanying conventional intruder perceiving systems and the infrared detecting apparatus used in such systems, and makes it an object of the present invention to provide an improved system for perceiving an intruder.

Another object of the present invention is to provide an improved infrared detecting apparatus whose infrared converging lens system can easily be manufactured and assembled in a simple manner.

To achieve the above objects, the intruder perceiving system in the present invention has its detectable-rays enveloping spaces arranged so that an intruder to be perceived may cross a plurality of those detectable-rays enveloping spaces at the same time, while the infrared detecting apparatus has its infrared converging lens system constituted in one plastic-molded body whose surface is shaped in the form of many successively connected lenses with principal axes differently directed.

BRIEF DESCRIPTION OF THE DRAWINGS

The present invention is described in detail on reference to the accompanying darwings, in which.

DETAILED DESCRIPTION OF THE INVENTION

Figure 1:
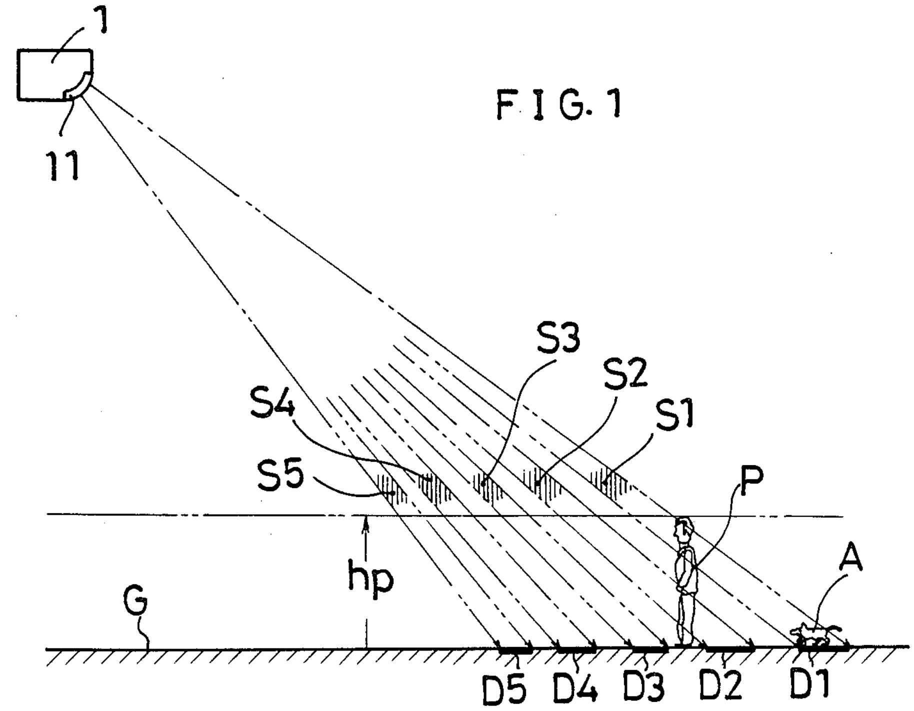
FIG. 1 schematically illustrates an intruder perceiving system in the present invention.
Figure 2:
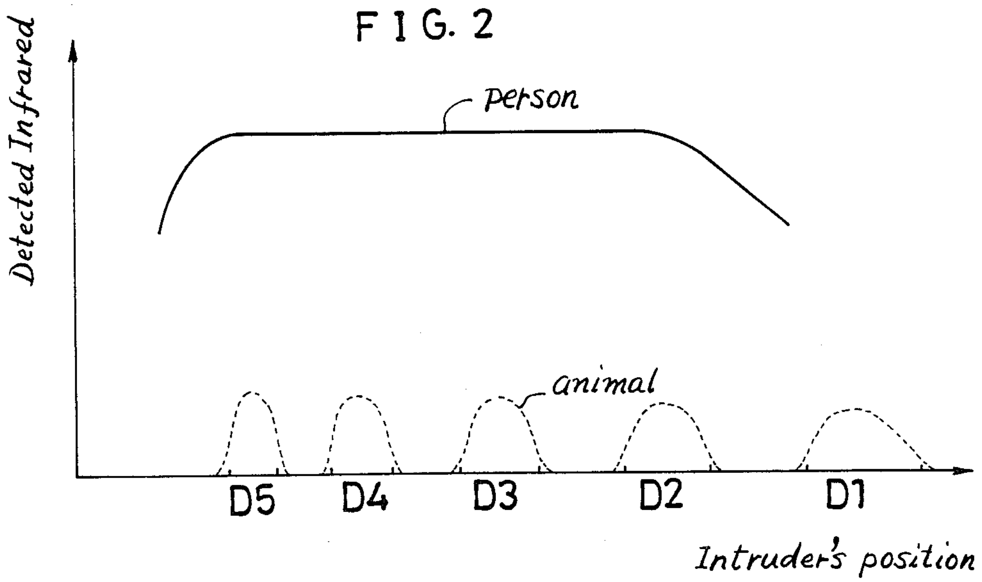
FIG. 2 shows a graphic representation of the output from an infrared detecting apparatus used in the above intruder perceiving system shown in FIG. 1.
Figure 7:
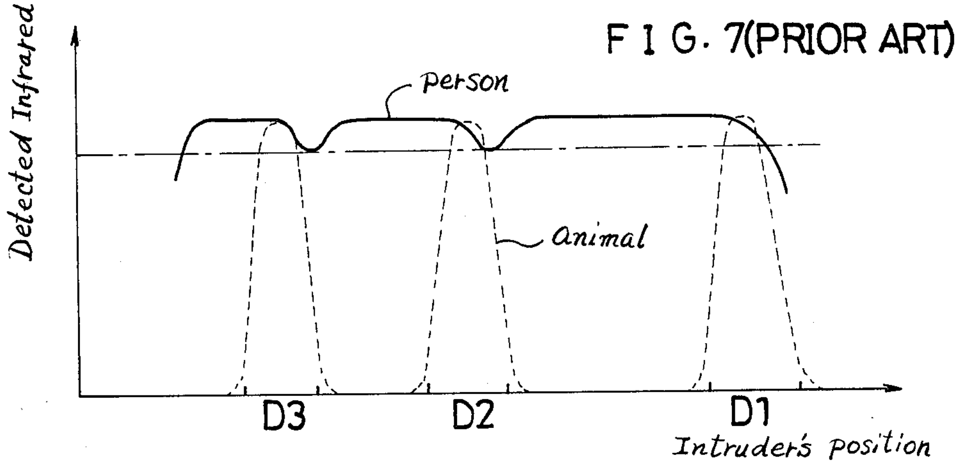
F I G. 7 (PRIOR ART)
FIG. 7 shows a graphic representation of the output from an infrared detecting apparatus used in the conventional intruder perceiving system shown in FIG. 6.
Figure 8:
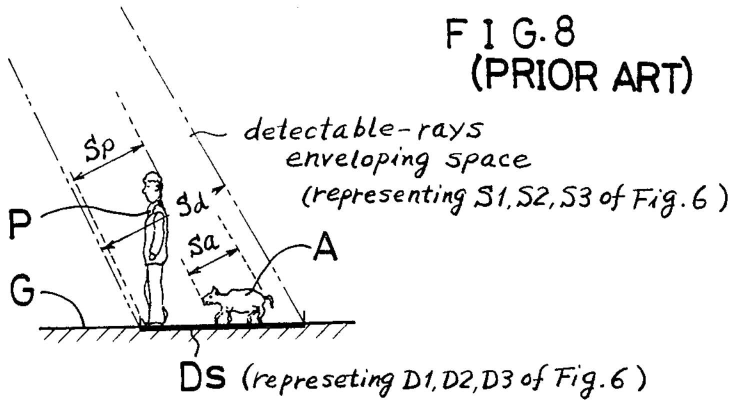
F I G. 8 (PRIOR ART)
FIG. 8 shows a modification of the detectable-rays enveloping spaces employed in the conventional intruder perceiving system shown in FIG. 6.
Figure 9:
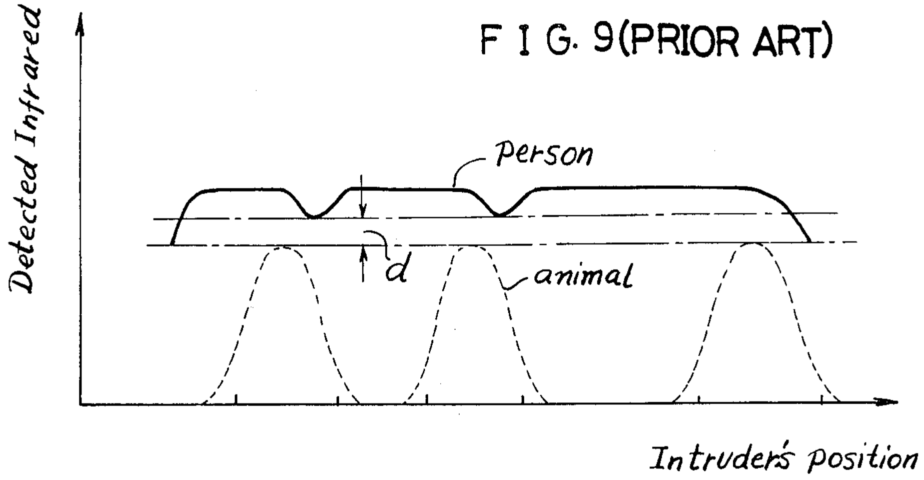
F I G. 9 (PRIOR ART)
FIG. 9 shows a graphic representation of the output obtained from the infrared detecting system when the detectable-rays enveloping spaces are modified as shown in FIG. 8.

Also in the present invention the intruder perceiving system, as is illustrated in FIG. 1, consists of an infrared detecting apparatus 1 devised so as to detect only the infrared rays being incident thereto within a plurality of detectable-rays enveloping spaces S1 to S5 spanned between an infrared converging lens system 11 of the infrared detecting apparatus 1 and sub-domains D1 to D5 supposed on a predetermined sepecific domain D of the ground G. In the present invention, however, the detectable-rays enveloping spaces S1 to S5 are set up densely so that a person P intruding into the domain D may cross a plurality of the detectable-rays enveloping spaces. In the system shown in FIG. 1, the number of detectable-rays enveloping spaces which an intruding person P crosses at the same time is chosen to be two. In addition the sub-domains D1 to D5 are spaced so that a small animals A short of stature may not bridge two adjacent sub-domains. According to such a constitution of the intruder perceiving system, the minimum intensity of detectable infrared radiation from a peson P is much stronger that the maximum intensity of detectable infrared radiation from an animal A. Therefore, the graphic representation of the output from the infrared detecting apparatus 1 is illustrated as shown in FIG. 2, which corresponds to FIG. 7. In FIG. 2 a solid line and dotted lines stand for the output in case of an intruder being a person and that in case of the intruder being an animal, respectively. Thus it is made possible by the present invention to distinguish a person from an animal.

Figure 3:
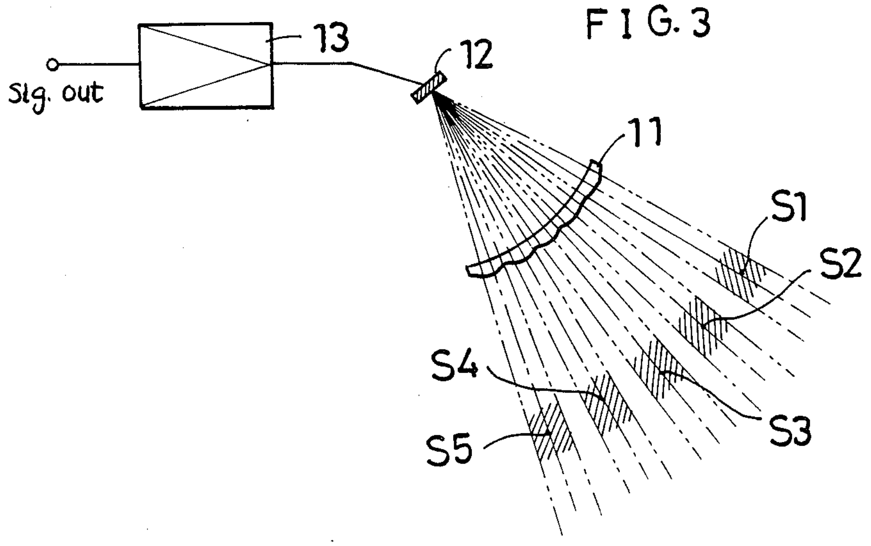
FIG. 3 shows a diagrammatical constitution of the infrared detecting apparatus used in the above intruder perceiving system shown in FIG. 1.

To realize such an intruder perceiving system, an embodiment of the infrared detecting apparatus 1 according to the present invention, as is schematically shown in FIG. 3, not only comprises an infrared converging lens system 11, an infrared detecting element 12 and an amplifier 13 similarly to an ordinary infrared detecting apparatus, but also has the lens system 11 constituted in one plastic-molded multi-lens element which is shaped on its surface in the form of five successively-connected lenses having their respective principal axes directed to their corresponding sub-domains D1 to D5 supposed on the ground. All of the lenses formed on the surface of the multi-lens element 11 convert the infrared rays propagated thereto through the detectable-rays enveloping spaces S1 to S5 onto the infrared detecting element 12. The output from the infrared detecting element 12 is inputted to the amplifier 13, which outputs the signal as shown in FIG. 2. The multi-lens element 11 is illustrated in detail in FIG. 4.

Figure 5:
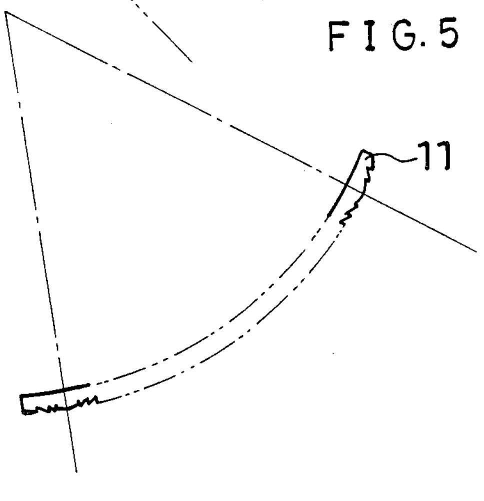
FIG. 5 shows a modification of the multi-lens element shown in FIG. 4.
Figure 6:
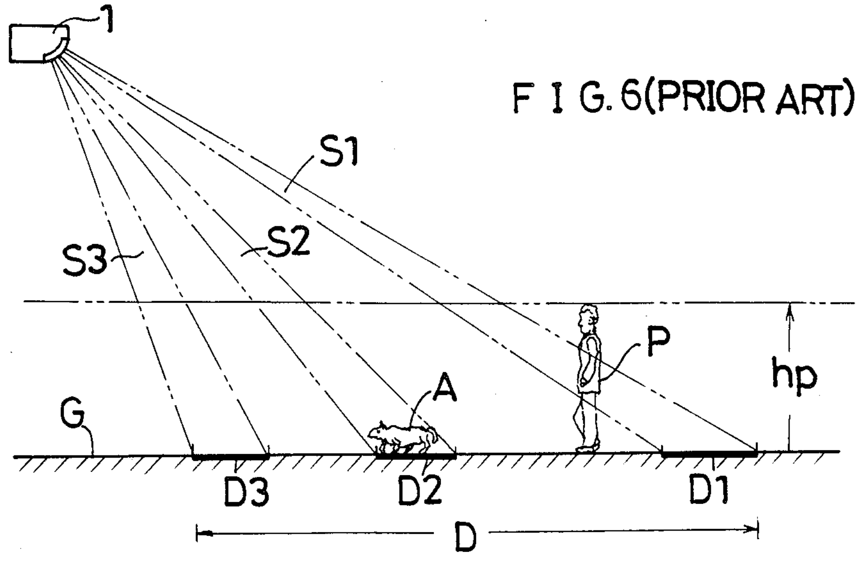
F I G. 6 (PRIOR ART)
FIG. 6 schematically shows a conventional intruder perceiving system.

In another embodiment of the infrared detecting apparatus 1, each of the lenses formed on the multi-lens element 11 can be made in the form of a Fresnel lens as shown schematically in FIG. 5.

Figure 4:
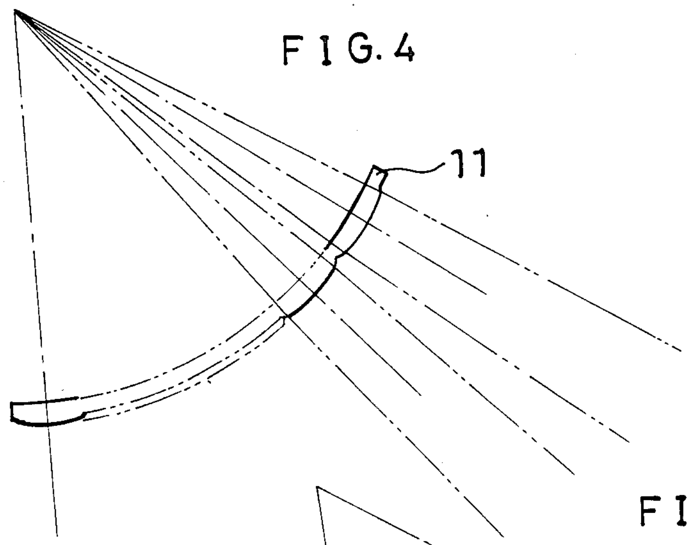
FIG. 4 shows a multi-lens element used in the infrared detecting apparatus shown in FIG. 3.

It is not to mention that the above multi-lens elements 11 shown in FIGS. 4 and 5, though made of plastic in the above embodiments, may well be made of any other materials if they have transparency and suitable refractive index against infrared rays radiated from the bodies at an ordinary temperature.

Figure 10:
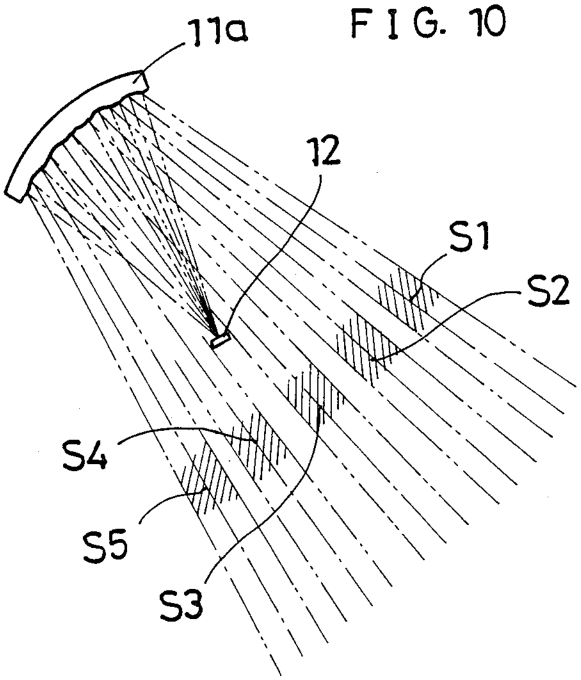
FIG. 10 shows a diagrammatical constitution of a modification of the apparatus shown in FIG. 3.

Further, the above embodiments can be modified by replacing the multi-lens element 11 with a multi-concave reflector element 11a as shown in FIG. 10.

Incidentally, as to the amplifier 13, any known electronic amplifiers can be used.

I claim:

1. An infrared detecting apparatus for perceiving an intruder into a predetermined region on the ground or on a floor by detecting infrared rays radiated from said intruder, said apparatus comprising:
   - a lens assembly provided higher than a predetermined height above said ground or floor and said predetermined region, said lens assembly having a plurality of differently angled non-overlapping visual fields directed to said predetermined region, said visual fields distributed so that an intruder having a stature taller than said predetermined height simultaneously crosses more than one of said visual fields of said lens assembly at a time and an intruder of a stature less than said predetermined height only crosses one of said visual fields at a time;
   - a single infrared radiation detecting element for converting infrared rays converted by said lens assembly to an electric signal; and
   - an amplifier means for amplifying said electric signal;
   - whereby an output of said amplifier is a continuous electric signal if said intruder is of a stature greater than said predetermined height and pulse electric signal if said intruder is of a stature less than said predetermined height.

2. An apparatus defined in claim 1, wherein said lens assembly consists of a plurality of convex lenses.

3. An apparatus defined in claim 2, wherein said lenses are Fresnel lenses.

4. An apparatus defined in claim 2, wherein said convex lenses are molded in one body.

5. An apparatus defined in claim 4, wherein said Fresnel lenses are molded in one body.

6. An apparatus defined in claim 1, wherein said lens assembly is replaced with an assembly of reflectors.

* * * * *